United States Patent
Loetz

(10) Patent No.: US 10,724,423 B2
(45) Date of Patent: Jul. 28, 2020

(54) VENTED PRE-CHAMBER ASSEMBLY FOR AN ENGINE

(71) Applicant: Caterpillar Inc., Peoria, IL (US)

(72) Inventor: Andrew Loetz, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 39 days.

(21) Appl. No.: 15/434,669

(22) Filed: Feb. 16, 2017

(65) Prior Publication Data
US 2018/0230894 A1    Aug. 16, 2018

(51) Int. Cl.
| F02B 19/18 | (2006.01) |
|---|---|
| F02B 19/10 | (2006.01) |
| F02B 75/10 | (2006.01) |

(52) U.S. Cl.
CPC .......... F02B 19/18 (2013.01); F02B 19/1009 (2013.01); F02B 75/10 (2013.01); *Y02T 10/125* (2013.01)

(58) Field of Classification Search
CPC combination set(s) only.
See application file for complete search history.

(56) References Cited

U.S. PATENT DOCUMENTS

| 8,813,716 | B2* | 8/2014 | Herold ............... F01P 3/12 |
| | | | 123/254 |
| 9,593,633 | B1* | 3/2017 | Kim ............... F02D 41/0077 |
| 2003/0196634 | A1* | 10/2003 | Lausch ............... F02B 1/12 |
| | | | 123/260 |
| 2005/0051130 | A1* | 3/2005 | Lampard ............... F02B 19/02 |
| | | | 123/261 |
| 2010/0132660 | A1* | 6/2010 | Nerheim ............... F02B 19/1014 |
| | | | 123/260 |
| 2013/0139784 | A1* | 6/2013 | Pierz ............... F02B 19/1009 |
| | | | 123/254 |
| 2013/0213347 | A1 | 8/2013 | Schaumberger et al. |
| 2016/0053673 | A1* | 2/2016 | Sotiropoulou ......... F02B 19/18 |
| | | | 123/260 |

FOREIGN PATENT DOCUMENTS

| CN | 2532250 | 1/2003 |
|---|---|---|
| JP | 09158729 | 6/1997 |
| JP | 2006177250 | 7/2006 |
| JP | 2007198140 | 8/2007 |
| JP | 2007198140 A * | 8/2007 |
| JP | 2015055185 | 3/2015 |

OTHER PUBLICATIONS

Machine Translation of JP2007198140A PDF file Name: "JP2007198140A_Machine_Translation.pdf".*

* cited by examiner

*Primary Examiner* — Lindsay M Low
*Assistant Examiner* — Ruben Picon-Feliciano
(74) *Attorney, Agent, or Firm* — Oblon, McClelland, Maier & Neustadt

(57) ABSTRACT

A prechamber assembly for a cylinder of a combustion engine is disclosed in which a plurality of ports placing a prechamber volume in fluid communication with the cylinder. A non-actuated, fixed orifice extends between the prechamber volume and a passageway formed in the prechamber assembly to permit combustion gases in the prechamber volume to enter the passageway. The passageway is configured to vent combustion gases therein out of the body. The orifice may reduce NOx emissions produced in the prechamber volume.

20 Claims, 4 Drawing Sheets

VENTED PRE-CHAMBER ASSEMBLY FOR AN ENGINE

TECHNICAL FIELD

The present disclosure relates an engine and more particularly relates to a prechamber assembly for such an engine.

BACKGROUND

In engines utilizing a prechamber, also referred to as a pre-combustion chamber, the prechamber is generally provided in a cylinder head of the engine. The prechamber is in fluid communication with the main chamber of a cylinder in the engine. A pilot charge of fuel and air is introduced into the prechamber. Combustion commences in the prechamber, and proceeds from the prechamber to the main chamber to combust a main charge of fuel and air. Engines utilizing prechambers may achieve high compression ratios and power output, however during operation, the temperature in the prechamber can exceed the temperature in the main chamber.

Japanese patent publication JP2015055185A to Toho Gas KK discloses a gas engine having a combustion chamber. A plug cover forms an ignition chamber in the combustion chamber. The plug cover has multiple communication ports that allow the ignition chamber to communicate with the combustion chamber. An ignition plug is provided in the ignition chamber to initiate combustion. An exhaust passage, controlled by an exhaust valve, opens into the ignition chamber for exhausting hot combustion gases therein to improve durability of the ignition plug.

SUMMARY OF THE DISCLOSURE

It has been found that a significant amount of NOx emissions may be formed in the prechamber during combustion of the main charge of fuel and air in the main chamber. When main chamber combustion commences, hot exhaust gases from combustion of the pilot charge remain in the prechamber. Movement of the cylinder piston towards top dead center re-compresses these hot exhaust gases in the prechamber. As a result, these hot exhaust gases are held at a high temperature and pressure until the cylinder piston moves towards bottom dead center and the gases expand. The presence of exhaust gases at high temperature and pressure can lead to significant NOx being produced in the prechamber.

In an aspect of the present disclosure, a prechamber assembly for a cylinder of a combustion engine comprises a body defining a prechamber volume at one end of the body. A plurality of ports are formed in the body near the one end, said ports placing the prechamber volume in fluid communication with the cylinder. A non-actuated, fixed orifice is formed in the body and extends between the prechamber volume and a passageway formed in the body to permit combustion gases in the prechamber volume to enter the passageway, wherein the passageway is configured to vent combustion gases therein out of the body.

In another aspect of the present disclosure, a combustion engine including a cylinder, the cylinder having a corresponding combustion prechamber associated therewith is provided. The engine comprises a body defining a combustion prechamber volume. A plurality of ports are formed in the body, said ports placing the combustion prechamber volume in fluid communication with the cylinder. A non-actuated, fixed orifice is formed in the body and extends between the prechamber volume and a passageway formed in the body to permit combustion gases in the prechamber volume to enter the passageway, wherein the passageway is configured to vent combustion gases therein out of the body.

In another aspect of the present disclosure, a method for reducing emissions from an engine including a cylinder is provided. The method comprises providing a combustion prechamber volume in fluid communication with the cylinder via a plurality of ports and providing a non-actuated, fixed orifice extending between the prechamber volume and a passageway to permit combustion gases in the prechamber volume to enter the passageway, wherein the passageway is configured to vent combustion gases therein out to one of an exhaust manifold or stack, an intake manifold, or an emission reduction system.

Other features and aspects of this disclosure will be apparent from the following description and the accompanying drawings.

DETAILED DESCRIPTION

The present disclosure relates to a prechamber assembly for a cylinder of a combustion engine. The prechamber assembly comprises a body defining a prechamber volume at one end of the body. Combustion of a pilot charge of fuel and air occurs in the prechamber volume. A non-actuated, fixed orifice is formed in the body and extends between the prechamber volume and a passageway formed in the body to permit combustion gases in the prechamber volume to enter the passageway. The passageway is configured to vent combustion gases therein out of the body. The non-actuated, fixed orifice and passageway permits hot combustion gases in the prechamber volume to leave the prechamber volume and be replaced with relatively cooler gases from a main chamber such as the cylinder. As a cylinder piston moves toward top dead center, the increase in pressure encourages the hot combustion gases in the prechamber volume into the orifice and passageway. The passageway is wider than the orifice so that the hot combustion gases undergo expansion cooling as they enter the passageway. Providing a non-actuated orifice simplifies engine controls and reduces component cost. The passageway may be connected to any suitable recipient of combustion gases, such as an intake manifold, exhaust manifold, or an aftertreatment system.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
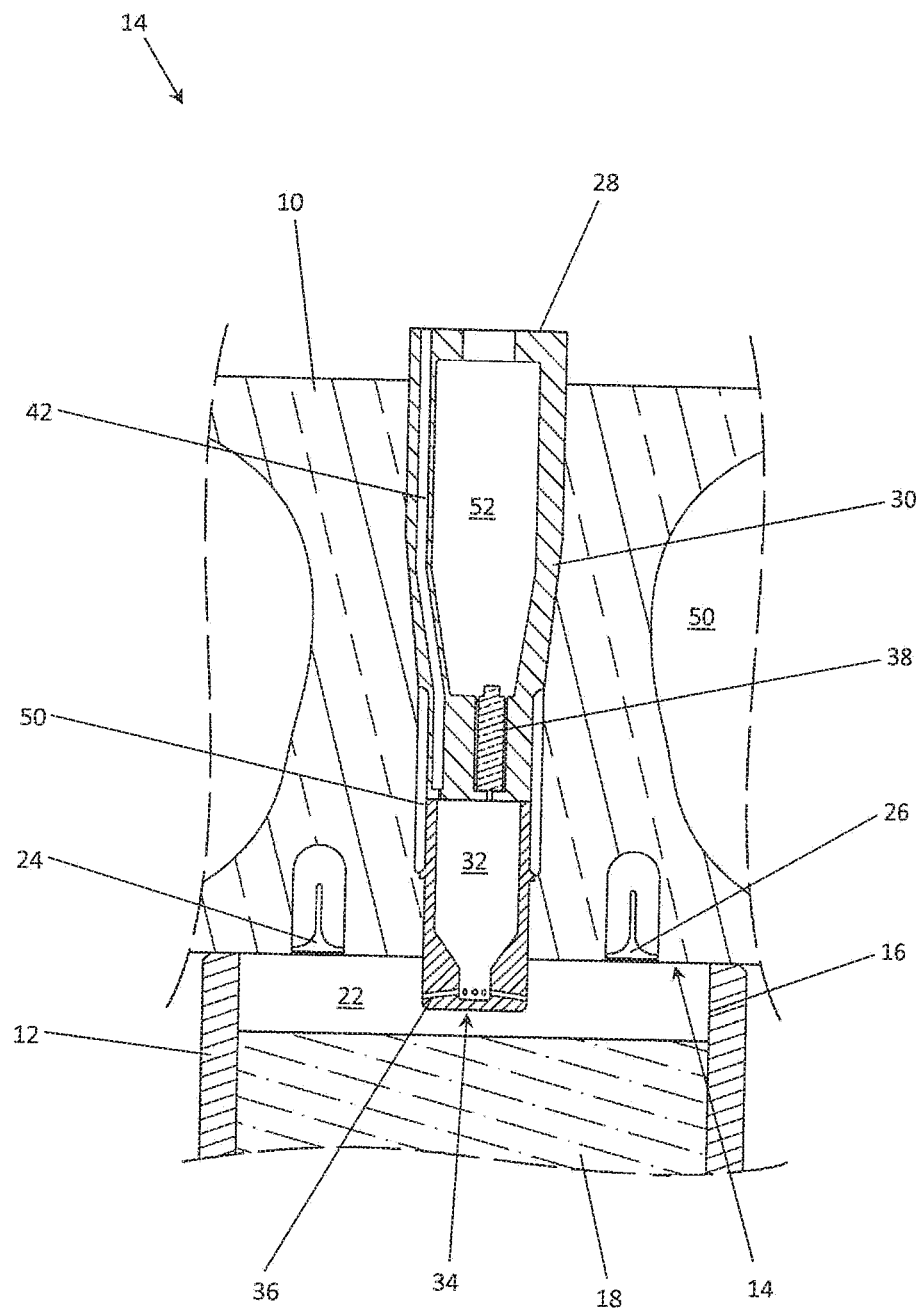
FIG. 1 illustrates a cross-section of a cylinder head of an engine equipped with a prechamber assembly, according to one embodiment of the present disclosure.

FIG. 1 illustrates a partial sectional view of a cylinder head 10 and a cylinder block 12 of an engine 14. The cylinder head 10 is mounted on the cylinder block 12. The engine 14 of the embodiment is a gas engine. The engine 14 may embody a compression ignition engine, a spark-ignition engine, or any type of combustion engine known in the art. The cylinder block 12 includes multiple cylinders 16, one of which is shown in cross-section in FIG. 1. The multiple cylinders 16 may be arranged in an inline configuration, a radial configuration, or any other configurations known in the art. The cylinder block 12 includes a piston 18 disposed within each cylinder 16.

The piston 18 reciprocates between a bottom dead center (BDC) to a top dead center (TDC) in one stroke. One cycle of an operation of the engine 14 includes various strokes, such as suction stroke, compression stroke, expansion stroke and exhaust stroke. A volume between the TDC and the BDC defines a swept volume. The swept volume is indicative of a volume available for a combusted charge to occupy. The phrase "charge" as used herein refers to a mixture of air and fuel. At TDC of the piston 18, a volume available between the piston 18 and an inner portion 20 of the cylinder head 10 is defined as a main combustion chamber 22.

The cylinder head 10 includes an inlet valve 24 for introducing a main charge into the cylinder 16. The cylinder head 10 also includes an inlet port (not shown) to allow the charge into the cylinder 16. Once the main charge is combusted in the main combustion chamber 22, the products of the combustion are forced out of the cylinder 16 during the exhaust stroke of the engine 14 via an exhaust valve 26.

The engine 14 further includes a prechamber assembly 28 provided in the cylinder head 10. The prechamber assembly 28 includes a body 30 defining a prechamber volume 32 at one end 34 of the body 30. The one end 34 of the prechamber assembly 28 extends into the main combustion chamber 22. Multiple ports 36 are provided in the body 30 at the one end 34. The ports 36 form a fluid pathway between the prechamber volume 32 and the cylinder 16.

An injector 38 is provided in the prechamber assembly 28 which introduces a pilot charge into the prechamber volume 32 during a compression stroke of the piston 18. The pilot charge is combusted during a prechamber combustion event triggered according to the type of combustion engine. For instance, combustion of the pilot charge may be triggered by compression due to movement of the piston 18 towards TDC in a compression ignition engine, or may be triggered by an ignition device—such as a spark plug or glow plug—in a spark-ignition engine. Since the prechamber volume 32 is fluidly connected to the cylinder 16, combustion proceeds from the prechamber volume 32 and into the main combustion chamber 22 to trigger combustion of the main charge in the cylinder 16. After the prechamber combustion event, hot exhaust gases from combustion of the pilot charge remain in the prechamber volume 32. As the piston 18 continues towards TDC these hot exhaust gasses are compressed and thereby heated. As a result, unwanted emissions may be produced in the prechamber volume 32, particularly NOx.

Figure 2:
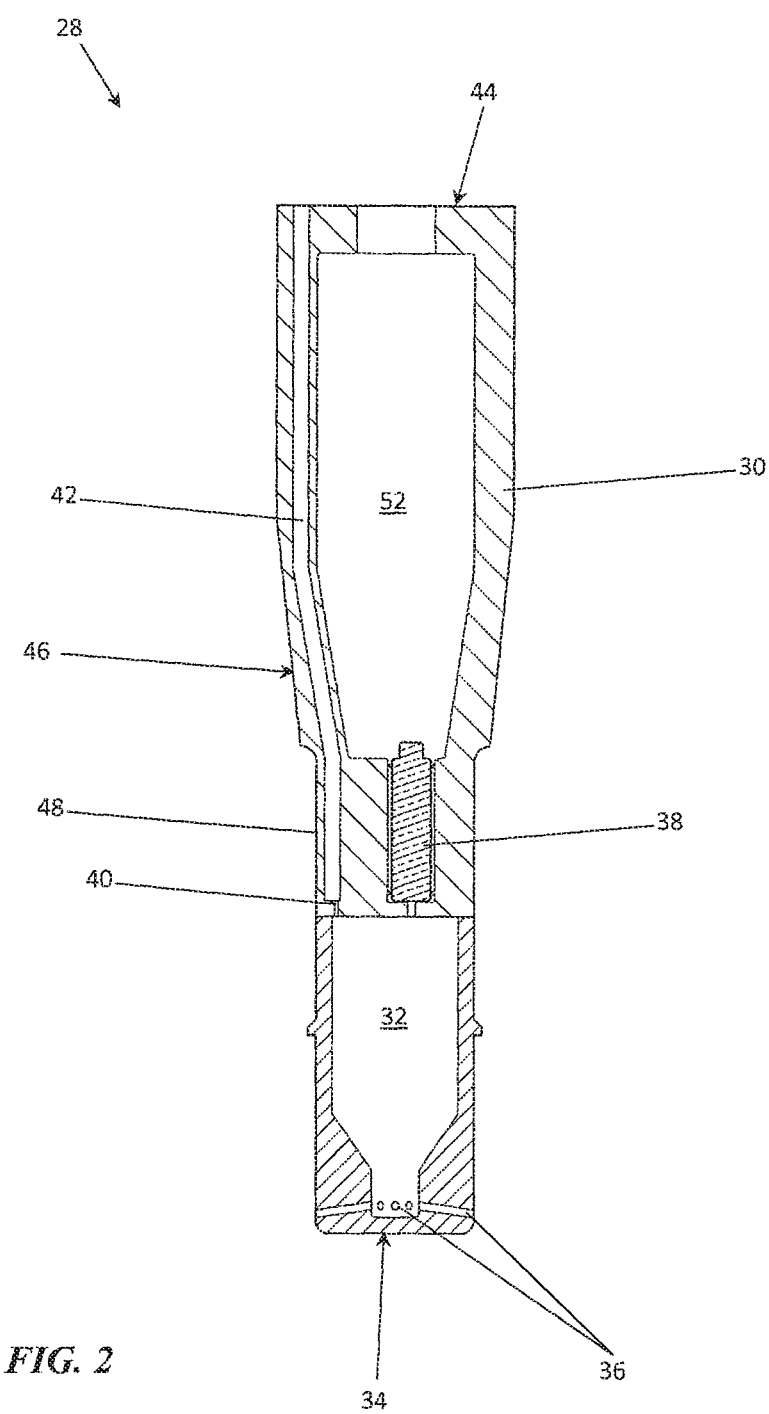
FIG. 2 illustrates the prechamber assembly of FIG. 1.

Referring now to FIG. 2, in which the prechamber assembly 28 is illustrated in enlarged form, an orifice 40 is formed in the body 30. The orifice 40 extends between the prechamber volume 32 and a passageway 42 formed in the body 30. The orifice 40 may open into the prechamber volume 32 remote from the one end 34. The orifice 40 is a non-actuated, fixed orifice, avoiding the need for further valves and associated controls which would increase the cost of the engine 14.

The orifice 40 permits hot combustion gases in the prechamber volume 32 to enter the passageway 42. The passageway 42 is of greater cross-sectional area than the orifice 40, so that when combustion gases enter the passageway 42 from the orifice 40, they expand and are cooled.

The passageway 42 may be configured to vent combustion gases therein out of the body 30. The passageway 42 may be configured to vent combustion gases therein to any suitable recipient of combustion gases, such as an exhaust manifold or stack, an intake manifold as part of an exhaust gas recirculation system, or an exhaust aftertreatment device or devices.

In the illustrated embodiment shown in FIG. 2, the passageway 42 is open at an other end 44 of the body 30. The other end 44 is remote from the one end 34. A connection arrangement (not shown) may be provided where the passageway 42 opens at the other end 44 to permit onward passage of the combustion gases. In one example, a threaded section may be formed in the passageway 42 at the other end 44 to receive a threaded conduit or pipe. In other examples, a flange protruding from the other end 44 may be provided around the passageway 42. Other suitable connection arrangements known in the art may also be used.

The passageway 42 may be formed close to an outer wall 46 of the body 30 along a section 48 of the body 30. The outer wall 46 of the body 30 along the section 48 may be in thermal communication with a cooling jacket 50 in the engine 14. Such an arrangement assists in cooling the combustion gases in the passageway 42.

While the passageway 42 is shown opening at the other end 44 of the body 30 in the embodiment shown in FIGS. 1 and 2, in other embodiments the passageway 42 may open to other locations on the body 30. In one embodiment the passageway 42 opens along the outer wall 46 to align with a corresponding passageway formed in the cylinder head 10. The corresponding passageway may extend to an inlet manifold or exhaust manifold of the engine. In another embodiment the passageway 42 may open into a cavity 52 formed in the body 30 for connection to pipe or conduit as described above. In the embodiment shown in FIGS. 1 and 2 the injector 38 is housed in the cavity 52.

Hot exhaust gases from combustion of the pilot charge remaining in the prechamber volume 32 after a prechamber combustion event are encouraged into the passageway 42 via the orifice 40 due to the pressure increase from the piston 18's continued movement towards TDC. Hot exhaust gases are replaced by relatively cooler gases from the cylinder 16.

The orifice 40 may have a diameter in the range 0.5 mm to 5 mm. In some embodiments, the orifice 40 may have a diameter in the range 2.0 mm to 3.5 mm. The orifice 40 has negligible impact on combustion of the pilot charge in the prechamber volume 32, since combustion of the pilot charge occurs so rapidly that relatively little gas can pass through the orifice 40.

Figure 3A:
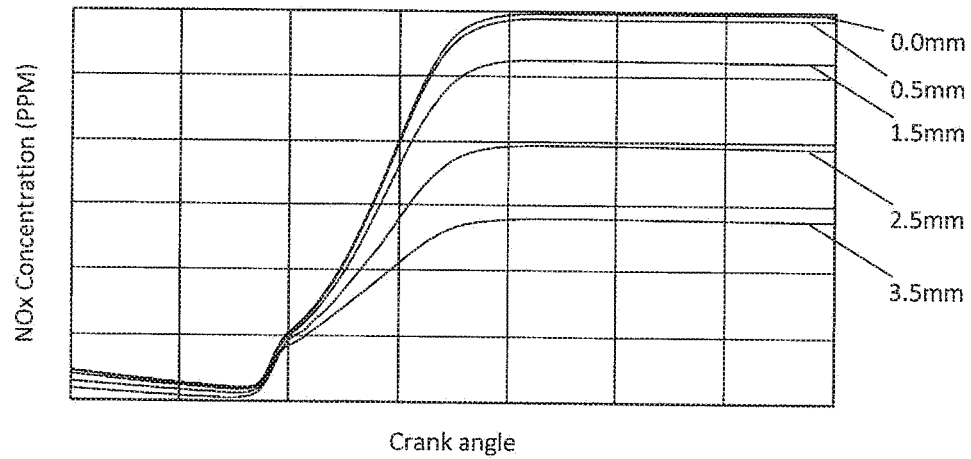
FIG. 3A illustrates the effect of orifice diameter on NOx concentration in an example prechamber volume according to the present disclosure.
Figure 3B:
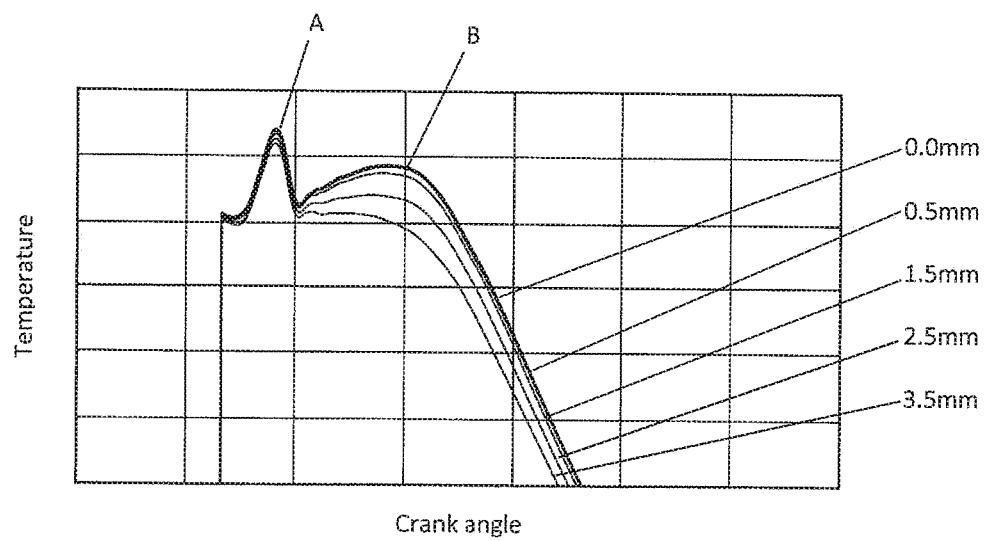
FIG. 3B illustrates the effect of orifice diameter on temperature in an example prechamber volume according to the present disclosure.

FIG. 3B shows temperature in an example of the prechamber volume 32, having a volume of 700 cc, when the orifice 40 is not present (represented as '0 mm'), and when the orifice 40 has a diameter of 0.5 mm, 1.5 mm, 2.5 mm and 3.5 mm. A first peak 'A' in FIG. 3B occurs during combustion of the pilot charge in the prechamber volume. The first peak 'A' is relatively narrow, occurring over a limited range of crank angles. A second peak 'B' occurs after the first peak 'A'. The second peak 'B' represents an increase in temperature in the prechamber volume due to pressure arising from main chamber combustion. As illustrated in FIG. 3B, the presence of the orifice 40 may assist in reducing a temperature of exhaust gases in present in the prechamber volume 32, which in turn may reduce the amount of unwanted emissions such as NOx produced in the prechamber volume 32.

FIG. 3A shows NOx concentration in the example prechamber volume 32 of 700 cc when no orifice 40 is present (represented as '0 mm'), and for orifices 40 of 0.5 mm, 1.5 mm, 2.5 mm and 3.5 mm diameter. As illustrated in FIG. 3A, relatively little NOx is produced during combustion of the pilot charge in the prechamber volume 32. A majority of NOx emissions are produced in the prechamber volume 32 during the main chamber combustion event, corresponding to the second peak 'B' in FIG. 3B. As illustrated in FIG. 3A, the presence of the orifice 40 may assist in reducing a concentration of NOx produced in the prechamber volume 32. As illustrated, an orifice 40 having a diameter in the range of 2.0 mm to 3.5 mm in a prechamber volume 32 of 700 cc may reduce a concentration of NOx produced in the prechamber volume 32 by 23% to 54%.

INDUSTRIAL APPLICATION

The prechamber assembly 28 of this disclosure may have application in reducing unwanted emissions, such as NOx, from a combustion engine.

Figure 4:
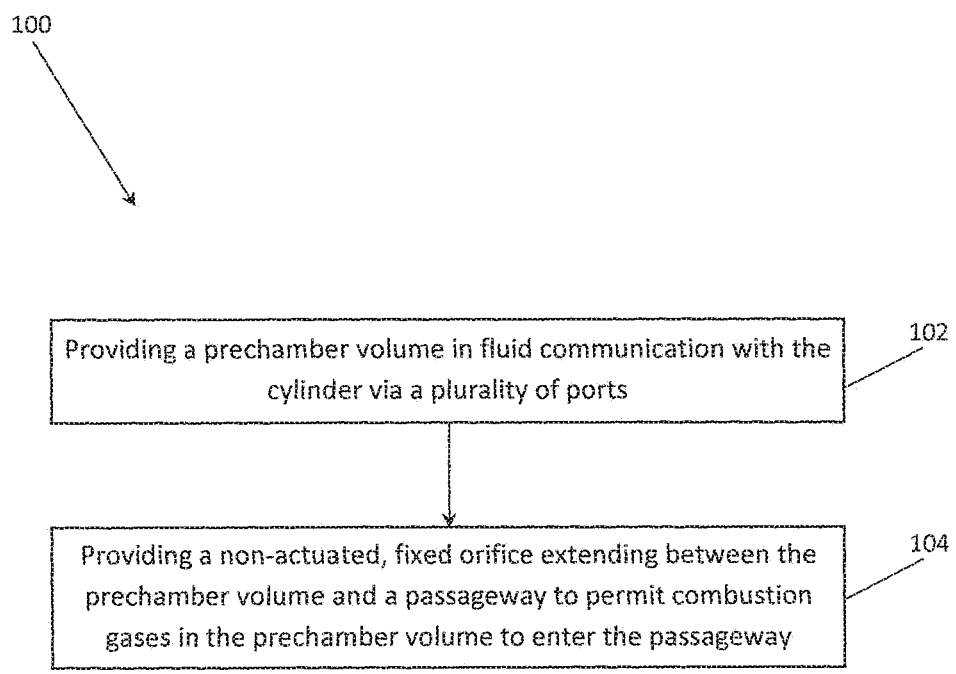
FIG. 4 illustrates a method for reducing emissions from an engine according to one embodiment of this disclosure.

FIG. 4 illustrates a method 100 for reducing emissions from an engine according to embodiments of this disclosure, the engine including a cylinder. The method commences at a step 102 of providing a combustion prechamber volume in fluid communication with the cylinder via a plurality of ports. The method continues at a step 104 of providing a non-actuated, fixed orifice extending between the prechamber volume and a passageway to permit combustion gases in the prechamber volume to enter the passageway. The passageway is configured to vent combustion gases therein out to one of an exhaust manifold or stack, an intake manifold, or an emission reduction system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A prechamber assembly for a cylinder of a combustion engine, comprising:
    a body defining a prechamber volume at one end of the body;
    a plurality of ports formed in the body near a first end of the body, said ports placing the prechamber volume in fluid communication with the cylinder; and
    a non-actuated, fixed orifice formed in the body and extending, between the prechamber volume and a non-actuated passageway formed in the body, that permits combustion gases in the prechamber volume to enter the passageway, wherein the passageway vents combustion gases therein out of the body,
    wherein, in a side sectional view of the body on a radial plane with respect to the prechamber volume, each of the passageway and the orifice is arranged in a non-overlapping relationship with the prechamber volume,
    wherein the orifice is exposed at an opening thereof into the prechamber volume and is provided at a second end of the body opposite the first end of the body near which the plurality of ports are provided, and
    wherein the orifice is sized to allow passage of the combustion gasses and disallow passage of uncombusted fuel from the prechamber volume to the passageway.

2. The prechamber assembly of claim 1, wherein the passageway has a greater cross-sectional area than the orifice, wherein combustion gases expand upon entering the passageway and are thereby cooled.

3. The prechamber assembly of claim 1, wherein the passageway is formed adjacent to an outer wall of the body along a section of the body.

4. The prechamber assembly of claim 3, wherein the outer wall of the body along the section is in thermal communication with a cooling jacket in the engine.

5. The prechamber assembly of claim 1, wherein the passageway is configured to vent combustion gases therein to one of an exhaust manifold or stack, or an emission reduction system.

6. The prechamber assembly of claim 1, wherein the orifice has a diameter in the range 0.5 mm-5 mm.

7. The prechamber assembly of claim 1, wherein, in a side sectional view, each of the passageway and the orifice is arranged in a non-overlapping relationship with the prechamber volume.

8. The prechamber assembly of claim 1, wherein the orifice opens into the prechamber volume remote from the one end.

9. A combustion engine including a cylinder, the cylinder having a corresponding combustion prechamber assembly associated therewith, the engine comprising:
    the combustion prechamber assembly including:
        a body defining a combustion prechamber volume;
        a plurality of ports formed in the body, said ports placing the prechamber volume in fluid communication with the cylinder; and
        a non-actuated, fixed orifice formed in the body, and extending between the prechamber volume and a non-actuated passageway formed in the body that permits combustion gases in the prechamber volume to enter the passageway, wherein the passageway vents combustion gases therein out of the body,
    wherein, in a side sectional view of the body on a radial plane with respect to the cylinder/prechamber volume, each of the passageway and the orifice is arranged in a non-overlapping relationship with the prechamber volume,
    wherein the orifice is exposed at an opening thereof into the prechamber volume and is provided at a first end portion of the body opposite a second end portion of the body at which the plurality of ports are provided, and
    wherein the orifice is sized to allow passage of the combustion gasses and disallow passage of uncombusted fuel from the prechamber volume to the passageway.

10. The engine of claim 9, wherein the passageway has a greater cross-sectional area than the orifice, wherein combustion gases expand upon entering the passageway and are thereby cooled.

11. The engine of claim 9, wherein the passageway is formed adjacent to a wall of the body along a section thereof.

12. The engine of claim 11, wherein the wall of the body along the section is in thermal communication with a cooling jacket in the engine.

13. The engine of claim 9, wherein the passageway is configured to vent combustion gases therein to one of an exhaust manifold or stack, an intake manifold, or an emission reduction system.

14. The engine of claim 9,
wherein the passageway cools the combustion gases as the combustion gases pass therethrough, and
wherein the combustion gases in the prechamber volume enter the passageway in response to movement of a piston toward top dead center (TDC).

15. The engine of claim 9, wherein the orifice has a diameter in the range 2.0 mm-3.5 mm.

16. The engine of claim 9, wherein the orifice opens into the combustion prechamber volume remote from the cylinder.

17. A method for reducing emissions from an engine, the engine including a cylinder, the method comprising:
providing a prechamber volume in fluid communication with the cylinder via a plurality of ports; and
providing a non-actuated, fixed orifice extending between the prechamber volume and a non-actuated passageway that permits combustion gases in the prechamber volume to enter the passageway, wherein the passageway vents combustion gases therein out to one of an exhaust manifold or stack, an intake manifold, or an emission reduction system,
wherein, in a side sectional view of the body on a radial plane with respect to the prechamber volume, each of the passageway and the orifice is arranged in a non-overlapping relationship with the prechamber volume,
wherein the orifice is exposed at an opening thereof into the prechamber volume and is provided at a first end portion of the body opposite a second end portion of the body at which the plurality of ports are provided, and
wherein the orifice is sized to allow passage of the combustion gasses and disallow passage of uncombusted fuel from the prechamber volume to the passageway.

18. The method of claim 17, wherein the passageway has a greater cross-sectional area than the orifice, wherein combustion gases expand upon entering the passageway and are thereby cooled.

19. The method of claim 17, wherein the passageway is formed adjacent to a cooling jacket in the engine.

20. The method of claim 17, wherein the orifice has a diameter in the range of 0.5 mm-5 mm.

* * * * *